Aug. 9, 1960     M. STOECKER     2,948,420

BALE STACKER DEVICE

Filed July 26, 1957     2 Sheets-Sheet 1

INVENTOR.
MILTON STOECKER,
BY
McMorrow, Berman & Davidson
ATTORNEYS.

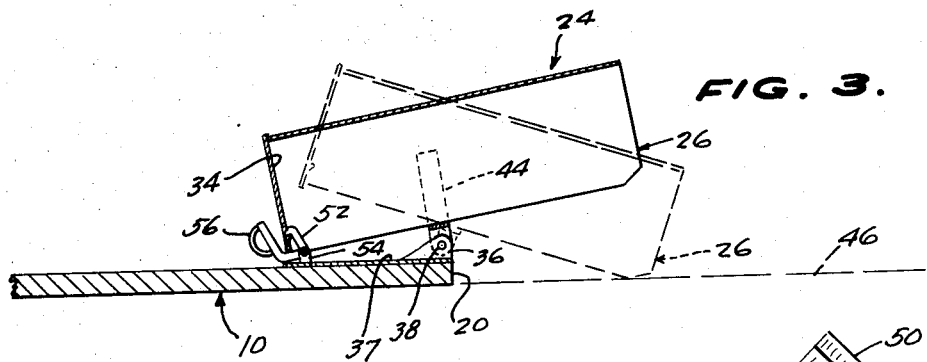
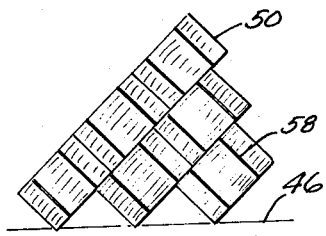
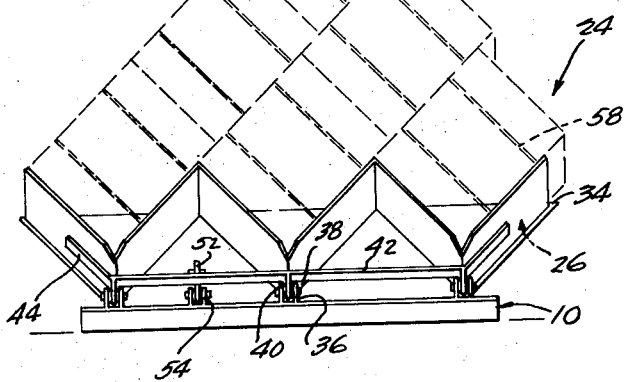
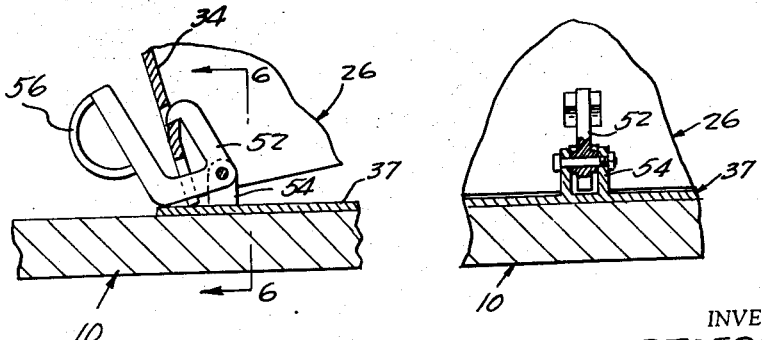

United States Patent Office 2,948,420
Patented Aug. 9, 1960

2,948,420

BALE STACKER DEVICE

Milton Stoecker, Box 182, McLaughlin, S. Dak.

Filed July 26, 1957, Ser. No. 674,426

2 Claims. (Cl. 214—9)

The present invention relates generally to farm implements and specifically to a device for stacking bales upon a ground surface.

An object of the present invention is to provide a bale stacking device which lends itself to efficient and rapid stacking of bales of hay, straw, or other forage upon a ground surface.

Another object of the present invention is to provide a bale stacking device which may be operated by a single individual and one which is semi-automatic in operation and stacks the bales in such a manner as to support their binding twines out of contact with the ground surface and protecting the same from mildew and rot.

A further object of the present invention is to provide a bale stacking device which stacks bales of forage in a position in which the bales are virtually free from damage by rain or other weather elements.

A still further object of the present invention is to provide a bale stacker which is of simple structure, sturdy in construction and having long life characteristics, one which may be economically manufactured and assembled, and one which is highly efficient in action.

These and other objects and advantages of the present invention will be fully apparent from the following description when taken in connection with the annexed drawings, in which:

Figure 3 is a sectional view taken on the line 3—3 of Figure 2, the full line showing indicating the loading position of the stacker and the dotted line showing indicating the unloading position of the stacker;

Figure 4 is a rear view elevation showing bales stacked upon the stacker and in dotted lines;

Figure 5 is a detailed view partially in section of the latching means for holding the stacker in the loading position;

Figure 6 is a view partially in section taken on the line 6—6 of Figure 5; and

Figure 7 is a view from the rear of a stack of bales as stacked by the bale stacker according to the present invention.

Figure 1:
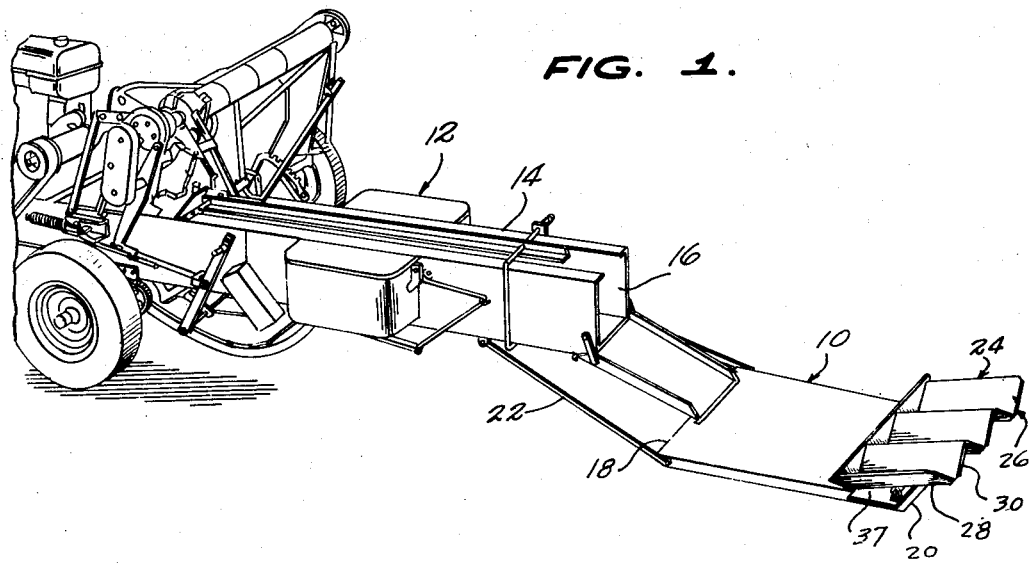
Figure 1 is an isometric view of the bale stacker according to the present invention, shown attached in tandem relation with a hay baler.
Figure 2:
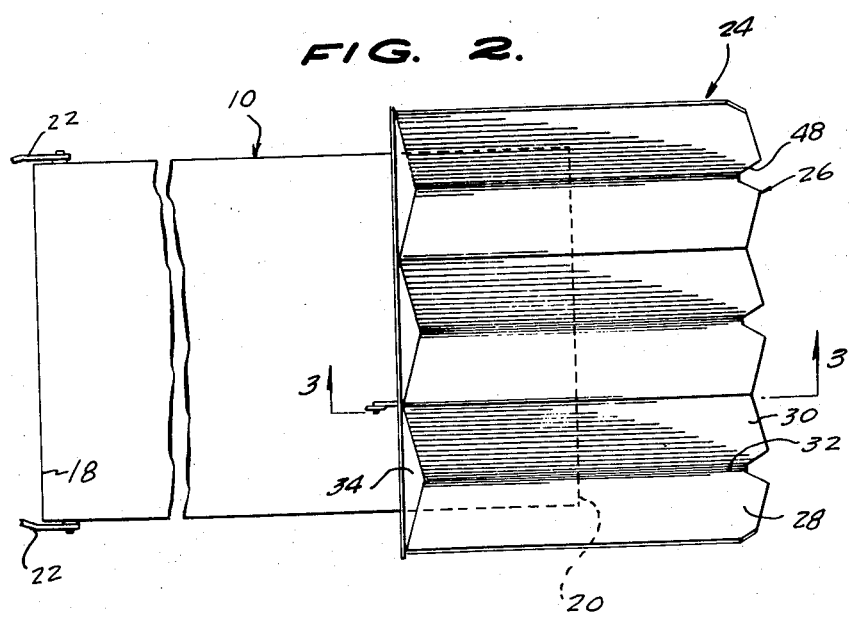
Figure 2 is a plan view of the assembly of Figure 1 removed from attachment to the hay baler, a portion of the platform being shown broken away.

Referring to the drawings in which like numerals indicate like parts of the several views, the bale stacker device, according to the present invention, comprises a platform 10 adapted to be arranged in tandem towing relation with a work vehicle. Preferably, the stacker of the present invention is used in combination with a mobile work vehicle, such as a hay baler 12, and adapted to travel over a ground surface, the baler 12 having a chute 14 projecting from and carried by the baler 12 and having a discharge end 16 remote from the baler 12 for delivering in turn to the discharge end freshly formed bales of hay, straw, or other forage.

When in use, the stacker platform 10 is arranged so that one end 18 thereof is inwardly of and adjacent discharge end 16 of the chute 14 and the other end 20 of the platform 10 is remote from the discharge end 16 of the chute 14. A pair of forwardly projecting tow bars 22 connect the one end of the platform 10 to suitable towing means on the under side of the baler 12 for movement of the platform 10 with the baler 12.

The stacker includes a bale stacker unit, designated generally by the reference numeral 24, consisting in a floor 26 having a plurality of V-shaped corrugations, here shown as three in number, extending from one end to the other end of the unit floor 26, each corrugation having sides 28 and 30 joined together at their lower ends by a smooth apex 32.

An end member 34 extends over one end of the floor 26 joining the sides 28 and 30 of each of the corrugations of the floor 26 and secured to the ends of said sides 28 and 30.

The stacker unit is positioned upon the platform 10 so that the end member 34 is transversely of the platform 10 and is spaced inwardly of the end 20 of the platform 10 with the end of the floor of the stacker adjacent the end member 34 normally resting upon the the adjacent portion of the platform 10. This position is shown in full lines in Figure 3. When in this position, a stacker unit has the other end of the floor 26 spaced rearwardly of and normally lying above the level of the end 20 of the platform 10.

A plurality of pairs of upright trunnions 36 are arranged along the platform 10 adjacent the end 20 thereof and are welded to a plate 37 bolted to the platform 10. The trunnions 36 receive therethrough bolts 38 (Figure 6) which extend through outwardly depending lugs 40 carried at spaced intervals along the bottom side of the horizontally disposed bar 42. The bar 42 extends under the floor 26 of the stacker unit 24 and has portions adjacent each end extending at an angle upwardly and forming reinforcing means for the adjacent sides of the respective corrugations in the floor 26, the reinforcing bar portion being indicated by the reference numeral 44 in the Figure 4.

The trunnions 36, bolts 38, and lugs 40 connect the stacker unit 24 to the platform 10 for movement from the position in which the end member 34 normally rests upon the adjacent portion of the platform 10 and the end of the floor 26 of the stacker unit 24 remote from the end member 34 is above the level of the end 20 of the platform 10 to a position in which the end of the floor 26 adjacent the end member 34 is spaced above the platform 10 and the opposite end of the floor 26 is adjacent to the ground surface 46, as shown in dotted lines in Figure 3. The apex 32 of the floor 26 is provided with a notch 48 through which projects a portion of a corner of a bale 50 when the floor 26 has been tilted to the position in which the end of the corrugation having the notch 48 is adjacent the ground surface.

In use, as the bales 50 are delivered in turn through the discharge end 16 of the chute 14, an operator standing upon the platform 10 stacks the bales 50 in the corrugations in the floor 26 with the adjacent sides of the bales abutting against the sides 28 and 30 of each corrugation and with one end of such bale 50 abutting against the end member 34. Other bales 50 are placed upon the bales 50 which are supported upon the floor 26 in interlocking stacked relation, as shown in Figure 4. Upon traveling movement of the platform 10 behind the baler 12, and upon execution of the rocking movement of the floor 26 of the unit 24 from the position in which the portion of the floor 26 adjacent the end member 34 rests upon the platform 10 to the position in which the end of the floor 26 remote from the end member 34 is adjacent to the ground surface 46, the bales in stacked relation are shifted from the position supported upon the floor 26 to a position deposited upon the ground surface 46, by virtue of the greater frictional engagement of the portion of the bales 50 which project outwardly of the floor 26 through the notches 48 with the ground surface 46 than the engagement of the sides of the bales with the sides 28 and 30 of the respective corrugations in the floor 26.

Cooperating releasable latch means is provided on the platform 10 and upon the end member 34 and is operable to hold the stacker unit in the position in which the end of the floor 26 adjacent the end member 34 rests upon the platform 10. Specifically, this means consists in, as shown in Figures 3 to 6 inclusive, a latch element 52 pivotally mounted upon an upstanding lug 54 which is secured to the platform 10 and having a portion thereof engageable within a slot provided in the end member 34 below the floor 26 of the unit 24. The latch element 52 has a handle portion 56 exteriorly of the end member 34 and in a position of accessibility to an individual standing upon the platform 10.

The stacker unit 24 when loaded with bales in stacked relation thereon may be tilted manually from the full line position shown in Figure 3 to the dotted line position, and upon execution of the movement of the platform 10 over the ground surface, the bales in stacked relation will be delivered, as shown in Figure 7, to the ground surface. The stacker unit 24 is then moved back to the full line position manually by the operator standing upon the platform 10 and carried thereby.

While only three corrugations are shown in the floor 26 of the stacker unit 24, other numbers of corrugations, greater or fewer, may be formed in the floor 26 if desired. Preferably, the upper or inner faces of the sides 28 and 30 of each corrugation in the floor 26 are polished smooth so that there is less friction of a bale 50 therein than the friction of the corner of the bale 50 when in engagement with the ground surface 46. This enables the operator thereof to have the bale 50 pulled from the corrugations of the floor 26 by friction with the ground surface 46 without recourse to manually shifting the bales out of the corrugations. As shown in Figure 7, the bales when in the stacked relation and deposited upon the ground surface 46 are so positioned that twines 58 are out of engagement with the ground surface 46 and the bales 50 are supported in a position in which rain or snow is less likely to damage such bales 50.

While only a single embodiment of the present invention has been shown and described, other embodiments are contemplated and numerous changes and modifications may be made therein without departing from the spirit of the invention, as set forth in the appended claims.

What is claimed is:

1. The combination with a mobile work vehicle adapted to travel over a ground surface and a chute projecting from and carried by said vehicle and having a discharge end remote from said vehicle for delivery in turn to the discharge end freshly formed bales of forage, of a device for stacking the bales in stacked relation and discharging the bales while in stacked relation to the ground surface, said device comprising a platform arranged so that one end thereof is inwardly of and adjacent the discharge end of said chute and the other end is remote from said chute discharge end and connected to said vehicle for movement with the latter, a bale stacker unit including a floor having a plurality of V-shaped corrugations extending from one end to the other end thereof, and an end member extending over one end of said floor and secured thereto, said stacker unit being positioned upon said platform so that the end member is transversely of the platform and spaced inwardly of the other end of said platform with the end of the floor of said stacker unit adjacent said end member normally resting upon the adjacent portion of said platform and the other end of the floor of said stacker unit spaced rearwardly of and normally lying above the level of the other end of said platform and connected to said platform for movement from the aforesaid position to a position in which the end of the floor of said stacker unit adjacent said end member is spaced above said platform and the other end of the floor of said stacker unit is adjacent to said ground surface, the floor of said stacker unit being adapted to receive and support in each of the V-shaped corrugations two adjacent sides of a bale with one end of the bale abutting against said end member and the portion adjacent the other end of the bale projecting beyond the other end of the flood of the stacker unit and with other bales interlockingly stacked upon the bales supported in the V-shaped corrugation of said stacker unit floor, said stacker unit when having the bales supported on said floor in the aforesaid relation and upon being moved to the position in which the stacker unit floor other end is adjacent the ground surface the projecting other end portions of the bales supported upon said floor surface engage the ground surface and responsive to traveling movement of said vehicle the bales in stacked relation are shifted from the stacker unit floor and deposited upon said ground surface.

2. The combination with a mobile work vehicle adapted to travel over a ground surface and a chute projecting from and carried by said vehicle and having a discharge end remote from said vehicle for delivery in turn to the discharge end freshly formed bales of forage, of a device for stacking the bales in stacked relation and discharging the bales while in stacked relation to the ground surface, said device comprising a platform arranged so that one end thereof is inwardly of and adjacent the discharge end of said chute and the other end is remote from said chute discharge end and connected to said vehicle for movement with the latter, a bale stacker unit including a floor having a plurality of V-shaped corrugations extending from one end to the other end thereof, and an end member extending over one end of said floor and secured thereto, said stacker unit being positioned upon said platform so that the end member is transversely of the platform and spaced inwardly of the other end of said platform with the end of the floor of said stacker unit adjacent said end member normally resting upon the adjacent portion of said platform and the other end of the floor of said stacker unit spaced rearwardly of and normally lying above the level of the other end of said platform and connected to said platform for movement from the aforesaid position to a position in which the end of the floor of said stacker unit adjacent said end member is spaced above said platform and the other end of the floor of said stacker unit is adjacent to said ground surface, cooperating releasable latch means on said platform and on said end member operable to hold said stacker unit in the position in which said end member normally rests upon the adjacent portion of said platform and the other end of the floor of said stacker unit is spaced rearwardly of and normally lying above the level of the other end of said platform, the floor of said stacker unit being adapted to receive and support in each of the V-shaped corrugations two adjacent sides of a bale with one end of the bale abutting against said end member and the portion adjacent the other end of the bale projecting beyond the other end of the floor of the stacker unit and with other bales interlockingly stacked upon the bales supported in the V-shaped corrugations of said stacker unit floor, said stacker unit when having the bales supported on said floor in the aforesaid relation and upon being moved to the position in which the stacker unit floor other end is adjacent the ground surface the projecting other end portions of the bales supported upon said floor surface engage the ground surface and responsive to traveling movement of said vehicle the bales in stacked relation are shifted from the stacker unit floor and deposited upon said ground surface.

References Cited in the file of this patent

UNITED STATES PATENTS

| | | |
|---|---|---|
| 2,740,250 | Olson et al. | Apr. 3, 1956 |
| 2,833,109 | Walker | May 6, 1958 |

OTHER REFERENCES

Periodical: Farm Implement and Machinery Review, June 1, 1956, pp. 185, 270–271.